(12) United States Patent
Ofenhitzer et al.

(10) Patent No.: US 6,244,966 B1
(45) Date of Patent: Jun. 12, 2001

(54) TORSIONALLY-RIGID COMPENSATING COUPLING

(75) Inventors: Thomas Ofenhitzer, Salz; Oliver Zegula, Bad Neustadt, both of (DE)

(73) Assignee: Preh-Werke GmbH & Co. KG, Saale (DE)

( * ) Notice: Subject to any disclaimer, the term of this patent is extended or adjusted under 35 U.S.C. 154(b) by 0 days.

(21) Appl. No.: 09/392,608

(22) Filed: Sep. 9, 1999

(30) Foreign Application Priority Data

Sep. 19, 1998 (DE) .............................................. 198 43 064

(51) Int. Cl.$^7$ ...................................................... F16D 3/16
(52) U.S. Cl. ........................................... 464/121; 464/112
(58) Field of Search .................................. 464/106, 112, 464/120, 121, 158, 905

(56) References Cited

U.S. PATENT DOCUMENTS

| 1,128,432 | | 2/1915 | Fetzer . | |
|---|---|---|---|---|
| 1,139,124 | * | 5/1915 | Kennedy | 464/112 |
| 1,863,244 | | 6/1932 | Goddard . | |
| 2,921,451 | | 1/1960 | Helmke . | |
| 3,091,102 | * | 5/1963 | Linderme | 464/120 |
| 3,098,365 | * | 7/1963 | Pearson | 464/120 |
| 4,065,941 | | 1/1978 | Aoki . | |
| 4,114,401 | * | 9/1978 | Van Hoose | 464/120 |

FOREIGN PATENT DOCUMENTS

| 20 48 324 | 4/1971 | (DE) . |
|---|---|---|
| 703 63 66 | 9/1973 | (DE) . |
| 810 27 86 U | 8/1981 | (DE) . |
| 2 727 483 | 5/1996 | (FR) . |
| 427 935 | 5/1935 | (GB) . |

OTHER PUBLICATIONS

Dubbel, Taschenbuch für den Maschinenbau, vol. 15, korrigierte und ergänzte Auflage p. 409. 1983.

Eugene Cloutier: "Quick Disconnect Coupling", Xerox Disclosure Journal, vol. 11, No. 2, Mar. 1986–Apr. 1986, p. 103, XP002123794.

\* cited by examiner

*Primary Examiner*—Lynne H. Browne
*Assistant Examiner*—Greg Binda

(57) ABSTRACT

A torsionally-rigid compensating coupling between first and second shaft ends has a ball bearing element positioned on the first shaft end and a ball socket element with grooves positioned on the second shaft end, with the ball bearing element including a ball bearing and a drive pin extending through the ball bearing. Pin ends of the drive pin extend out of the ball bearing into the grooves of the ball socket element. The grooves and ball socket of the ball socket element, in a longitudinal direction of the second shaft end, open out into a cylindrical recess that has a guide chamfer. The ball bearing element includes an elastic-force creating member and stops, with the elastic-force creating member driving the drive pin against the stops to fix the drive pin in its working position by elastic force, the drive pin being moveable against the elastic force in a longitudinal direction of the second shaft end.

4 Claims, 1 Drawing Sheet

TORSIONALLY-RIGID COMPENSATING COUPLING

BACKGROUND OF THE INVENTION

This invention relates to a torsionally-rigid compensating coupling between two shaft ends, particularly for control elements in vehicles, having a ball bearing element positioned on one shaft end and a ball socket element positioned on the other shaft end, and a drive pin extending through a ball bearing of the ball bearing element, the ends of which extend out of the ball bearing element into grooves of the ball socket element.

Dubbel's Fachbuch für den Maschinenbau (Technical Book for Mechanical Engineering), 15$^{th}$ Edition, page 409, FIG. 4d, for example, discloses a torsionally-rigid compensating coupling of this type. This coupling is not suited for mounting a ball bearing/ball socket coupling, for coupling shaft ends which are respectively attached to additional elements, for example, to a control element at one end and to a drive motor at the other end. That is, this and other such prior-art torsionally-rigid compensating couplings are not suitable for mounting in a vehicle.

It is an object of the invention, therefore, to provide an easy-to-mount torsionally-rigid compensating coupling, which particularly makes it easy to join the coupling elements.

SUMMARY OF THE INVENTION

According to principles of this invention, a torsionally-rigid compensating coupling between first and second shaft ends has a ball bearing element positioned on the first shaft end and a ball socket element with grooves positioned on the second shaft end, with the ball bearing element including a ball bearing and a drive pin extending through the ball bearing. Pin ends of the drive pin extend out of the ball bearing into the grooves of the ball socket element. The grooves and ball socket of the ball socket element, in a longitudinal direction of the second shaft end, open out into a cylindrical recess that has a guide chamfer. The ball bearing element includes an elastic-force creating member and stops, with the elastic-force creating member driving the drive pin against the stops to fix the drive pin in its working position by elastic force, the drive pin being moveable against the elastic force in a longitudinal direction of the second shaft end.

BRIEF DESCRIPTION OF THE DRAWING

The invention is described and explained in more detail below using an embodiment shown in the drawings. The described and drawn features can be used individually, or in preferred combinations, in other embodiments of the invention. The foregoiing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
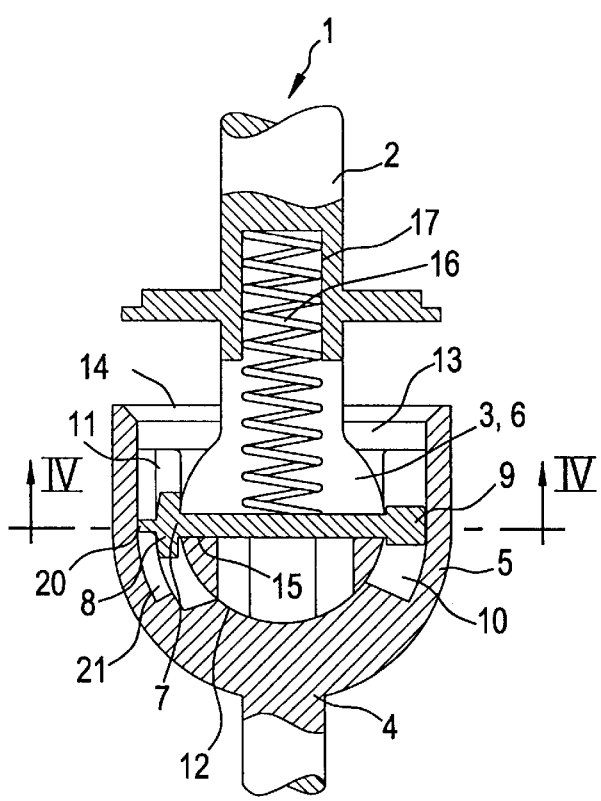
FIG. 1 is a longitudinal sectional view of a torsionally-rigid compensating coupling of this invention in a neutral working position of coupling elements and of shaft ends.
Figure 2:
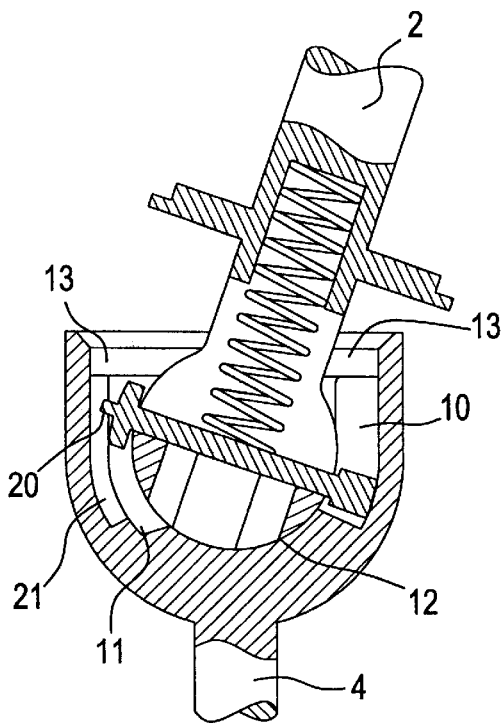
FIG. 2 is a view similar to FIG. 1, with the compensating coupling in a compensating position.

FIGS. 1 and 2 show respectively longitudinal sections of a torsionally-rigid compensating coupling 1 in a neutral working position and in a compensating position of a coupling element and shaft ends, as particularly intended for use in motor vehicles, with a ball bearing element 3 positioned at a first shaft end 2 and a ball socket element 5 positioned at a second shaft end 4 and a drive pin 7 extending through a ball bearing 6 of the ball bearing element 3, with pin ends 8, 9 of the driving pin 7 extending out past the ball bearing element 3 and engaging in grooves 10, 11 of the ball socket element 5.

The grooves 10, 11 and a ball socket 12 of the ball socket element 5, in a longitudinal direction of the shaft end 4, open out into a cylindrical recess 13 that has a guide chamfer 14 at its mouth that facilitates insertion, and the drive pin 7, which is moveable against elastic force in a longitudinal direction of the first shaft end 2, is pushed against stops 15, that fixes the drive pin 7 in its working position, by the elastic force.

These measures alone make assembly of the ball socket element possible without engagement of the drive pin 7 in the grooves 10, 11. This engagement then occurs by turning one of the shaft ends 2 or 4 no more than one halfturn, without the further measures described below, It can be seen that a spring (elastic-force creating member) 16, creating the elastic force, is positioned in a cylindrical recess 17 of the first shaft end 2 supporting the ball bearing element 3. This recess 17 is centered with respect to the first shaft end 2 and opens centrally with respect to the first shaft end 2 from the ball bearing element 3 or ball bearing 6. At the pin ends 8, 9 extending out from the ball bearing element 3, or ball bearing 6, the drive pin 7 has collar-forming lateral projections 18, 19 for fixing it axially to the ball bearing 6, or ball bearing element 3, whereby the collar-forming lateral projections 18, 19 are structured of unequal (smaller and larger) size and engage in the grooves 10, 11 of the ball socket element 5 that are structured of corresponding sizes. In comparison to the smaller lateral projection 18, the larger lateral projection 19 has a smaller axial length and further includes a small, axial, projection trunnion 20 that engages in an additional groove 21 extending from the larger groove 11 and opening into the cylindrical recess 13. This measure provides a predetermined arrangement of the shaft ends 2, 4 after no more than one complete rotation.

Figure 3:
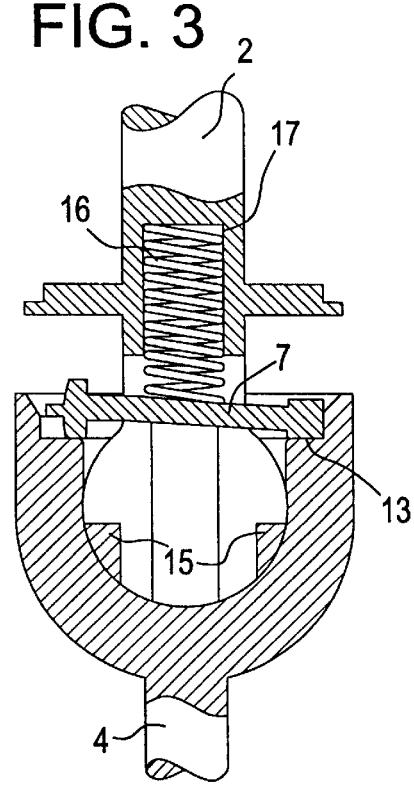
FIG. 3 is a longitudinal sectional view of the compensating coupling of FIG. 1 in a mounting position of a drive pin during a mounting step.

By structuring the compensating coupling according to this invention, it becomes possible to couple the shaft ends 2, 4, for example, in a vehicle itself, whereby, upon joining together the ball socket element and ball bearing element, the drive pin 7, as shown in FIG. 3, lies against an axial wall forming the recess 13 and rises from the stops 15 that fix its working position by stressing the spring 16, and, upon relative rotation of the first and second shaft ends 2 and 4, engages in the corresponding grooves 10, 11, 21; i.e. the projections 18, 19, 20 of the drive pin 7 travel about the recess 13 until they are at the corresponding grooves 10, 11, 21 and, under the elastic force of the spring 16, are pressed, with the drive pin 7, to the stops 15. The small projection trunnion 20 at the largest lateral projection 19 ensures that the smaller lateral projection 18 does not engage in the largest groove, thereby ensuring accurate alignment of the shaft ends 2, 4.

Figure 4:
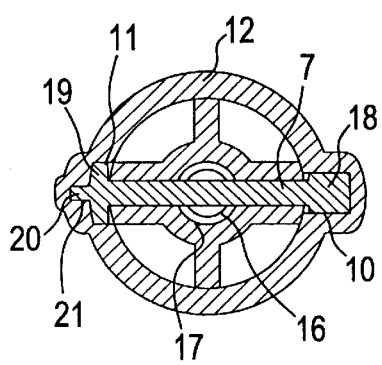
FIG. 4 is a longitudinal cross-sectional view through the drive pin of FIG. 1 taken on line IV—IV in FIG. 1.

FIG. 4 shows a cross section through the drive pin, showing the recess 17 for the spring 16, the drive pin 7 with the projections 18, 19 and the projection trunnion 20, the grooves 10, 11, 21, and the recess forming the ball socket 12.

The torsionally-rigid compensating coupling of this invention allows uncomplicated mounting of the compensating coupling.

The invention claimed is:

1. Torsionally-rigid compensating coupling between first and second shaft ends having a ball bearing element positioned on the first shaft end and a ball socket element with grooves positioned on the second shaft end, said ball bearing element including a ball bearing and a drive pin extending through the ball bearing, with pin ends of the drive pin extending out of the ball bearing for engaging in the grooves of the ball socket element, wherein the grooves and ball socket of the ball socket element, in a longitudinal direction of the second shaft end, open out into a cylindrical recess that has a guide chamfer, and wherein said ball bearing element includes an elastic-force creating member and stops, said elastic-force creating member driving the drive pin against said stops to fix the drive pin in the drive pin's working position by elastic force, said drive pin being moveable against the elastic force in a longitudinal direction of the first shaft end.

2. Compensating coupling as in claim 1, wherein the elastic-force creating member is a spring which is positioned in a cylindrical recess of the first shaft end that is centered with respect to the first shaft end and opens centrally from the ball bearing.

3. Compensating coupling as in claim 2, wherein, the pin ends of the drive pin extending out of the ball have collar-forming lateral projections for fixing the drive pin axially to the ball bearing.

4. Compensating coupling as in claim 3, wherein the collar-forming lateral projections are respectively structured as larger and smaller projections which engage in the grooves of the ball socket element, and wherein said grooves are structured as first and second grooves, with said first groove being larger than said second groove, to respectively fit said larger and smaller projections, wherein, in comparison to the smaller projections the larger projection has a smaller axial length and a small projecting trunnion that engages in a third groove in the socket element extending from the larger first groove and opening into the cylindrical recess of the first shaft.

\* \* \* \* \*